Jan. 10, 1961   J. R. ARCHER   2,968,001
CRYSTAL DIODE TEST APPARATUS
Filed Dec. 4, 1958
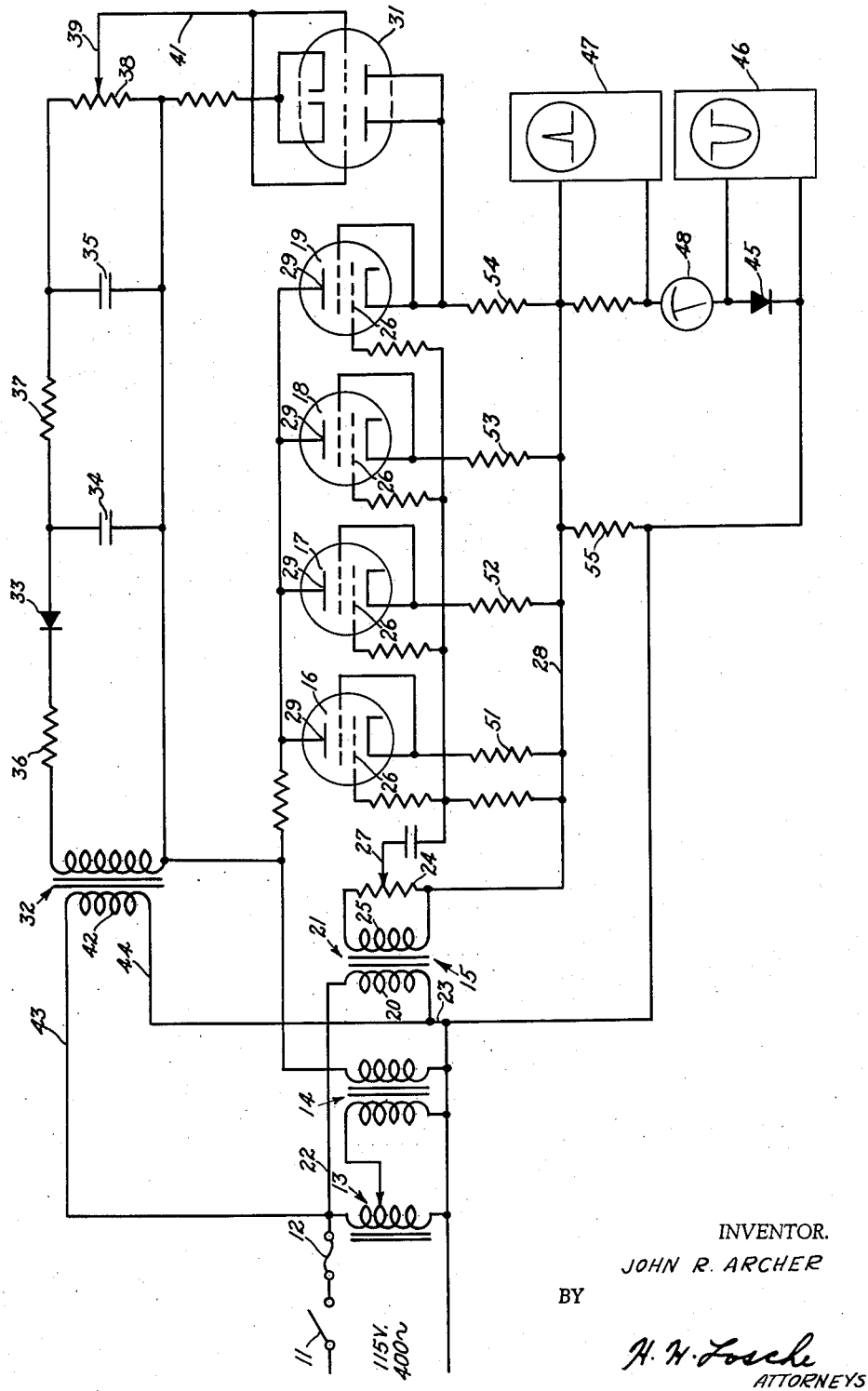
INVENTOR.
JOHN R. ARCHER
BY
H. H. Losche
ATTORNEYS

United States Patent Office 2,968,001
Patented Jan. 10, 1961

2,968,001

CRYSTAL DIODE TEST APPARATUS

John R. Archer, Indianapolis, Ind., assignor to the United States of America as represented by the Secretary of the Navy Filed Dec. 4, 1958, Ser. No. 778,269

4 Claims. (Cl. 324—158)

(Granted under Title 35, U.S. Code (1952), sec. 266)

The invention described herein may be manufactured and used by or for the Government of the United States of America for governmental purposes without the payment of any royalties thereon or therefor.

The present invention relates to a crystal diode test device and more particularly to a test device that will determine if a crystal diode will withstand the maximum current and voltage ratings when applied simultaneously.

Large quantities of crystal diodes are presently being used in both commercial and Government equipment. This use of crystal diodes has increased remarkably in the past few years, particularly the use of crystal diodes as a substitute for vacuum tubes. Crystal diodes are used for many general purposes, and are designed to operate as rectifiers, clippers, D.C. restorers, modulators, and the like.

Various methods of rating crystal diodes are employed in the industry, but particularly crystal diodes are rated as to three important factors; namely, peak current, average current, and peak inverse voltage.

Peak current is defined as the maximum forward current which may flow for one-half cycle without damage to the diode. The average current is defined as the average of the maximum currents which can be carried by the diode without appreciable heating of the unit or change in its characteristics. The peak inverse voltage is the value of the maximum inverse voltage which can be safely applied across the diode for an indefinite period of time without damage to the crystal.

The present invention provides a novel circuit for applying the maximum current and maximum inverse voltage simultaneously. This simultaneous application of maximum current and voltage permits a rapid testing of crystal diodes and furthermore permits a more realistic test than does a separate application of maximum current and maximum voltage. In the novel circuit of the present invention, there is provided a forward current channel and an inverse voltage channel. The forward current channel clips and shapes the voltage to cause the desired current flow through the diode under test. The inverse voltage channel passes only the negative portion of the input voltage which is fed to the diode under test. As the voltage is clipped and shaped, the value for the peak current is considerably greater than that obtainable by a positive sine wave, and yet the average current value is kept at a low level. The provision of very high peak current in a diode tester is particularly desirable when testing diodes that are to be used in magnetic amplifiers.

It is therefore a general object of the present invention to provide a novel circuit arrangement for testing crystal diodes.

Another object of the present invention is to provide a test device that will confirm the characteristics of semiconductor diodes.

Still another object of the present invention is to provide a novel circuit arrangement that will determine whether or not a crystal diode will withstand maximum rated current and maximum rated inverse voltage when applied simultaneously.

Other objects and many of the attendant advantages of the present invention will be readily appreciated as the same become better understood by reference to the following detailed description when considered in connection with the accompanying drawing which is a schematic diagram of an embodiment of the present invention.

Referring now to the drawing, a suitable source of alternating current is provided, such as, for example, 115 volts, 400 cycle. A customary on-off switch 11 and fuse 12 are provided as shown. A variable transformer 13 and a step-up transformer 14 are connected to a suitable source of alternating current. The variable transformer 13 is provided for adjusting the peak current value, and the transformer 14 is provided to furnish suitable high voltage.

A phase shifting network 15 is provided, and a plurality of thyratron tubes 16 to 19, inclusive, are connected to the output of this network. As shown in the drawing, the primary 20 of a transformer 21 is connected to the source of alternating current through leads 22 and 23, and a variable resistor 24 is connected to the secondary 25. The grid 26 of each thyratron is connected to the movable contact 27 of resistor 24, and each cathode is connected to one end of the secondary 25 through lead 28. The adjustment of the average firing time of the thyratron tubes is accomplished by positioning the movable contact 27 of resistor 24. The high voltage output of transformer 14 is applied to the plate 29 of each thyratron. By way of example, the thyratron tubes 16 to 19, inclusive, might be of the type 2D21, well known in the art, and transformer 14 might possibly be a 6:1 transformer.

An inverse voltage channel is included which provides regulated direct current voltage for biasing tube 31. This inverse voltage channel is comprised of transformer 32, rectifier 33, capacitors 34 and 35, and resistors 36, 37 and 38. Resistor 38 is a variable resistor, and the movable contact 39 is electrically connected to the grids of tube 31 through lead 41. The primary 42 of transformer 32 is connected to the alternating current source through leads 43 and 44. Tube 31, which might be a twin-triode amplifier, such as a type 6SN7–GT, well known in the art, supplies negative peak inverse voltage to the diode 45 under test.

Resistor 38 can be adjusted until the desired peak inverse voltage is supplied to diode 45, and an oscilloscope 46 is provided to indicate the value of the voltage. Also an oscilloscope 47 is provided to indicate peak current, and a direct current meter 48 is provided to indicate the average current.

As shown in the drawing, resistors 51 to 54, inclusive, are provided to permit proper functioning of the thyratron tubes 16 to 19, inclusive, and to limit the load current so that each thyratron tube will carry its proper share. Resistor 55 is connected in parallel relation with diode 45 under test in order to provide a path for current flow through tube 31 when the back resistance of diode 45 approaches infinity.

In operation, the crystal diode 45 to be tested is connected in the test apparatus and the variable transformer 13 is adjusted to set the peak current for which the diode 45 is rated. The peak current is indicated on the calibrated oscilloscope 47. Next the movable contact 27 of resistor 24 is adjusted to set the average current, which is indicated on meter 48. The movable contact 39 of resistor 38 is then adjusted to set the peak inverse voltage on the diode 45, and this voltage is indicated on oscilloscope 46. The diode 45 under test is then subjected to the peak current and the peak inverse voltage for a predetermined length of time, and if diode 45 is properly rated and not defective it will not be adversely affected by the applied voltage and current.

It can thus be seen that the novel circuit disclosed herein provides a rapid means of determining whether or not a crystal diode will withstand its maximum rated current and voltage when applied simultaneously.

Obviously, many modifications and variations of the present invention are possible in the light of the above teachings. It is therefore to be understood that the invention may be practiced otherwise than as specifically described.

What is claimed is:

1. A test set for confirming the characteristics of a crystal diode comprising, a source of alternating current, a crystal diode to be tested, a forward current channel connected to said source of alternating current and polarized to conduct current only during the positive half-cycles of said alternating current for applying current to said crystal diode, said forward current channel including shaping and clipping means for providing high peak current to said crystal diode, an inverse voltage channel connected to said source of alternating current and polarized to conduct current only during the negative half-cycles of said alternating current for applying predetermined peak inverse voltage to said crystal diode and separate means for indicating the average forward current, the forward peak current, and the peak inverse voltage of said crystal diode.

2. A test set for confirming the characteristics of a crystal diode as set forth in claim 1 wherein the said forward current channel includes adjustable means for setting the average current on said crystal diode to be tested.

3. A test set for confirming the characteristics of a crystal diode as set forth in claim 1 wherein said inverse voltage channel includes adjustable means for establishing predetermined amplitude of the peak inverse voltage applied to the said crystal diode to be tested.

4. A test set for confirming the characteristics of a crystal diode comprising, a source of low voltage alternating current; a source of high voltage alternating current derived from the said low voltage source; a crystal diode to be tested; means for rectifying the said high voltage comprising, a forward current channel polarized to conduct current only during the positive half-cycles of said high voltage alternating current for applying peak current to said crystal diode, said forward current channel including shaping and clipping means for providing high peak current to said crystal diode, an inverse voltage channel polarized to conduct current only during the negative half-cycles of said high voltage alternating current for applying peak inverse voltage to said crystal diode; and separate means for indicating the average forward current, the forward peak current, and the peak inverse voltage of said crystal diode.

References Cited in the file of this patent

UNITED STATES PATENTS

| | | |
|---|---|---|
| 2,698,419 | Blair | Dec. 28, 1954 |
| 2,849,682 | Herr | Aug. 26, 1958 |

OTHER REFERENCES

"Crystal Diode Tester," Radio and Television News, September 1955, pp. 72, 73 and 144.